(12) United States Patent
Yochai (10) Patent No.: US 10,884,934 B1
(45) Date of Patent: Jan. 5, 2021

(54) PREFETCHING DATA UNITS TO A CACHE OF A STORAGE SYSTEM

(71) Applicant: Yechiel Yochai, Lehavot Haviva (IL)

(72) Inventor: Yechiel Yochai, Lehavot Haviva (IL)

( * ) Notice: Subject to any disclaimer, the term of this patent is extended or adjusted under 35 U.S.C. 154(b) by 0 days.

(21) Appl. No.: 16/255,884

(22) Filed: Feb. 20, 2019

(51) Int. Cl.
*G06F 12/0862* (2016.01)
(52) U.S. Cl.
CPC .... G06F 12/0862 (2013.01); *G06F 2212/602* (2013.01); *G06F 2212/6026* (2013.01)
(58) Field of Classification Search
None
See application file for complete search history.

(56) References Cited

U.S. PATENT DOCUMENTS

| | | | | |
|---|---|---|---|---|
| 6,792,496 B2 * | 9/2004 | Aboulenein | ........ | G06F 13/4031 710/306 |
| 7,380,059 B2 * | 5/2008 | Burton | ................ | G06F 12/0862 711/113 |
| 7,890,555 B2 * | 2/2011 | Gunda | ................... | G06F 11/004 707/822 |
| 10,346,360 B1 * | 7/2019 | Basov | ................... | G06F 16/172 |
| 2007/0055702 A1 * | 3/2007 | Fridella | ................. | G06F 16/122 |
| 2007/0283101 A1 * | 12/2007 | El-Essawy | .......... | G06F 12/0862 711/137 |
| 2007/0294482 A1 * | 12/2007 | Kadambi | ............ | G06F 12/0862 711/137 |
| 2015/0143057 A1 * | 5/2015 | Pavlou | .................... | G06F 12/02 711/137 |
| 2017/0230476 A1 * | 8/2017 | Dow | ................... | H04L 67/2847 |
| 2018/0329824 A1 * | 11/2018 | Adachi | ................. | G06F 3/0683 |

* cited by examiner

*Primary Examiner* — Elias Mamo
(74) *Attorney, Agent, or Firm* — Reches Patent (57) ABSTRACT

A method for prefetching in a mass storage system, the method may include receiving or generating a request to fetch, to a cache memory of the mass storage system, a certain data unit that is currently not stored in the cache memory; wherein the certain data unit and additional data units form a certain cluster of data units; wherein the certain data unit and the additional data units have similar activity signatures; wherein at least two data units of the certain cluster differ from each other by at least one of (a) a file system, (b) a logical volume, and (c) an accessing unit; wherein for each data unit of the certain cluster, an activity signature related to the data unit provides a coarse estimation of activity related to the data unit during multiple time periods; fetching the certain data unit stored in a mass storage unit; and prefetching at least some of the additional data units that are not currently stored in the cache memory.

19 Claims, 7 Drawing Sheets

PREFETCHING DATA UNITS TO A CACHE OF A STORAGE SYSTEM

BACKGROUND

Prefetching is a caching technique used to improve the performance storage system, by reading data to the cache memory before receiving an actual request to access the data. The effectiveness of prefetching is dependent on the correct prediction that are based on historical observation. Historical observations involve recognizing patterns of access, such as addresses that are read together, or reading a specific address that follows reading of another specific address.

Some prefetch mechanisms are aware of data objects that are usually read together, and refer to these data objects as a group, so that once one of the group's members is read into the cache memory, all the other members in the group are prefetched into the cache, even before being actually requested. This technique is usually used to detect sequential accesses, and to prefetch blocks that follows blocks that are requested to be read.

Detecting groups of data objects that are usually read together is a computationally intensive and sometimes intractable task, especially when there is no spatial relation or any other known relation among the data objects. Furthermore, in mass storage systems, that store several petabytes of data and handle millions access requests per second, it would require an enormous amount of metadata for detecting data contents that are requested to be accessed together or within short time windows (without hints about any relations between the data contents), so generally the implementation of grouping objects in such situations is not practical.

SUMMARY

There may be provided a method, a storage system and a computer program product as illustrated in the specification and/or the claims and/or the drawings.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

The system and methods of the present invention are used for clustering different data units that are stored in a storage system, based on activity signatures that characterize the data units. The activity signatures are built by monitoring the activity that involves the data units, during multiple time periods, which may count several days (but may be shorter or longer). Once the activity signatures are created, they are used to find data units having similar activity signatures. Data units with similar activity signatures can be clustered, and be read together to the cache. An activity signature reflects activity, in term of access (read/write), towards a data unit, through the multiple time periods of the monitoring. Clustered data units share similar activity periods, but may not share similar or close locations within the storage system, may belong to different volumes, different filesystems and different accessing entities (e.g., servers, computers or applications that access the storage).

Figure 1:
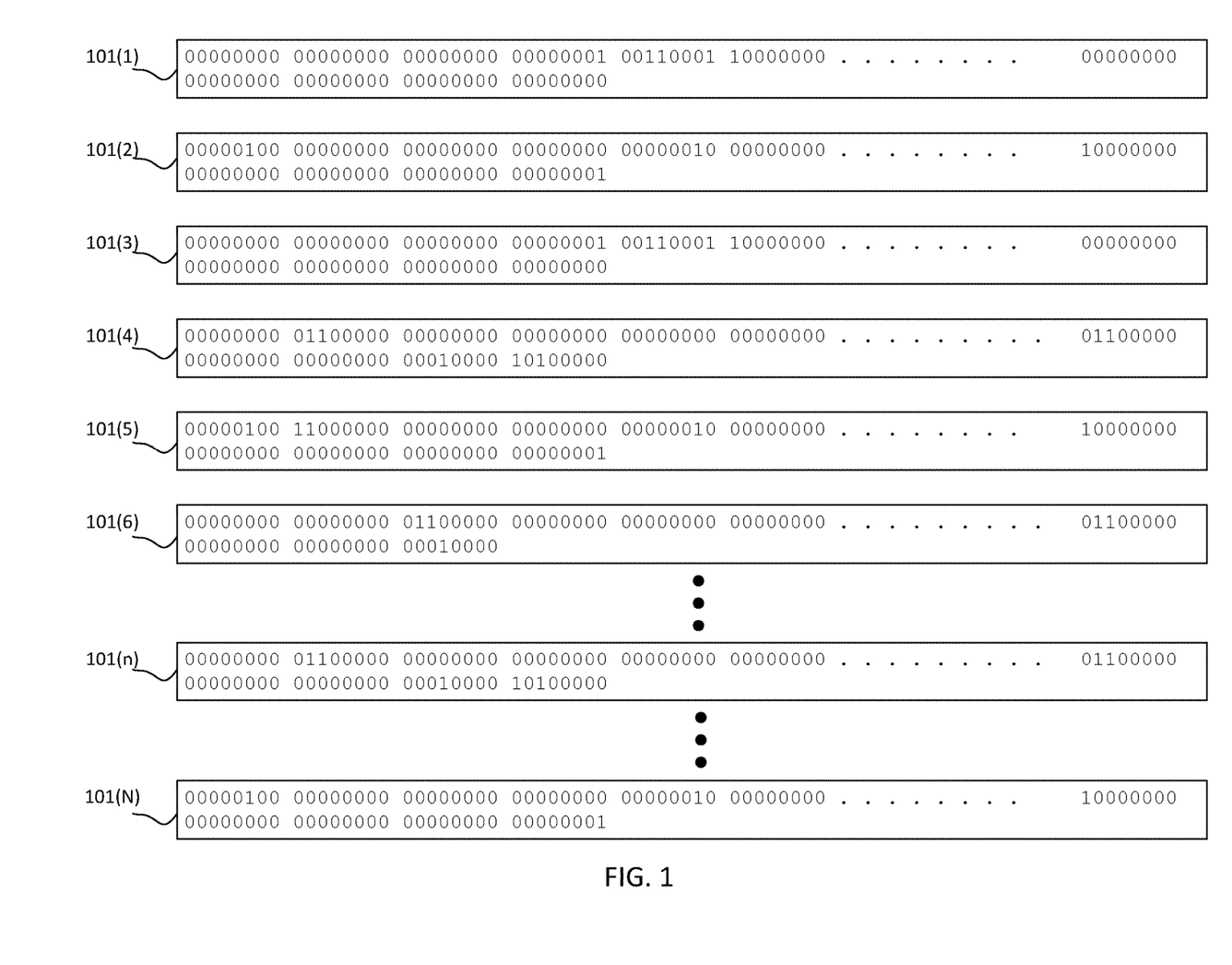
FIG. 1 illustrates an example of activity signatures.

FIG. 1 illustrates activity signatures 101(1)-101(N) of N data units that are stored in a storage system. Each activity signature 101 reflects activity towards a certain data unit, as was monitored over multiple time periods, and may be a bitmap, as illustrated in FIG. 1, or any other bit presentation.

The data unit may be a data chunk of a fixed size or variable size. The data chunks may be formed by virtually dividing the entire address space of the storage system into data chunks. Preferably, the size of a data chunk is substantially large, e.g., 4 Mbytes, so as to accelerate the formation of the activity signatures, but any other size that is smaller or larger than 4 Mbytes can be used. The data unit may otherwise be the data content of an object that is stored in a storage system, such as a file, filesystem, Database-table, etc.

Figure 2:
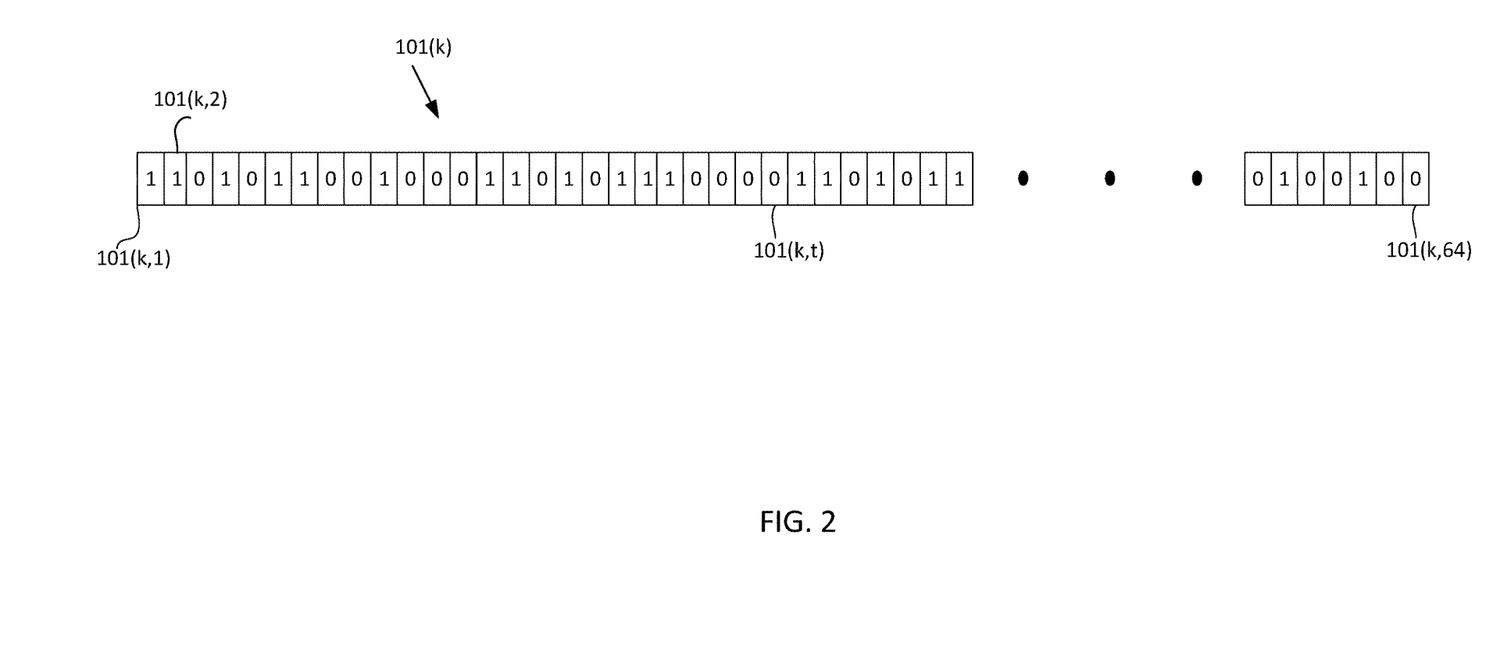
FIG. 2 illustrates an example of an activity signature.

FIG. 2 illustrates an activity signature 101(k), of a data unit k that belongs to the N data units. In this example, the activity signature is composed of 64 components, wherein each component reflects activity that was detected during a certain time period within the multiple time periods, during which the monitoring was performed. In this example the multiple time periods of the monitoring are composed of 64 time periods, but any other number of time periods may be implemented.

The time periods may be of a fixed size or variable sizes, may be sequential in time or not. In this example, it is assumed that each time period is of one hour and the entire monitoring was performed during 64 hours, so that the activity signature 101(k) represents activity during 64 hours.

Any signature-component, e.g., 101(k,t), may be indicative of activity that occurred during the corresponding time period, e.g., time period t. The activity indication maybe for example, whether or not access activity (read and/or write requests) was detected towards the data unit k through the duration of the time period t. For example, during the first and second time periods (e.g., first and second hours) of the monitoring, activity was detected towards the data unit, as reflected in signature-components 101(k,1) and 101(k,2), which hold the value '1'. During the 64'th hour there was no activity, as reflected by signature-component 101(k, 64). Signature-component 101(k,t) reflects whether activity was detected during time period t (e.g., the t'th hour).

Detected activity towards a data unit can be defined when a certain level of activity was monitored, or a certain level of activity of specific characteristics was monitored. For example, detected activity may be defined as detecting any access towards to the data unit. Alternatively, detected activity can be defined as at least certain amount of access requests towards the data unit, or at least certain amount of access requests having certain characteristics (e.g., above or below a certain requested size to be read or written). The activity may refer to read requests, write requests or both. For example, a threshold for defining activity can be set to: at least X access requests, e.g., X=5; at least X read requests, and/or at least Y write requests; at least X access requests for reading less than 256 bytes; at least Y write requests for writing more than 1 Mbytes; etc. Therefore, the set bit ('1') of signature-component 101(k,1) may indicate, for example, that more than 5 access requests were addressed towards the data unit during the first time period.

Referring back to FIG. 1, different data units share similar activity signatures. For example, activity signature 101(1) of a first data unit is similar to activity signature 101(3) of a third data unit. Activity signatures may be defined as similar (or matching) when at least a certain amount or a certain percentage of the signature components are equal, for example, when above 70% of the signature components are identical. Activity signatures 101(2), 101(5) and 101(N) are considered as matching even though the 9th and 10th signature components (in the second octet) of 101(5) is different from the same signature components of 101(2) and 101(N). Activity signatures 101(4), 101(6) and 101(n) are considered as matching, even though, the content of activity signature 101(6) is shifted to the right by one octet.

Figure 3:
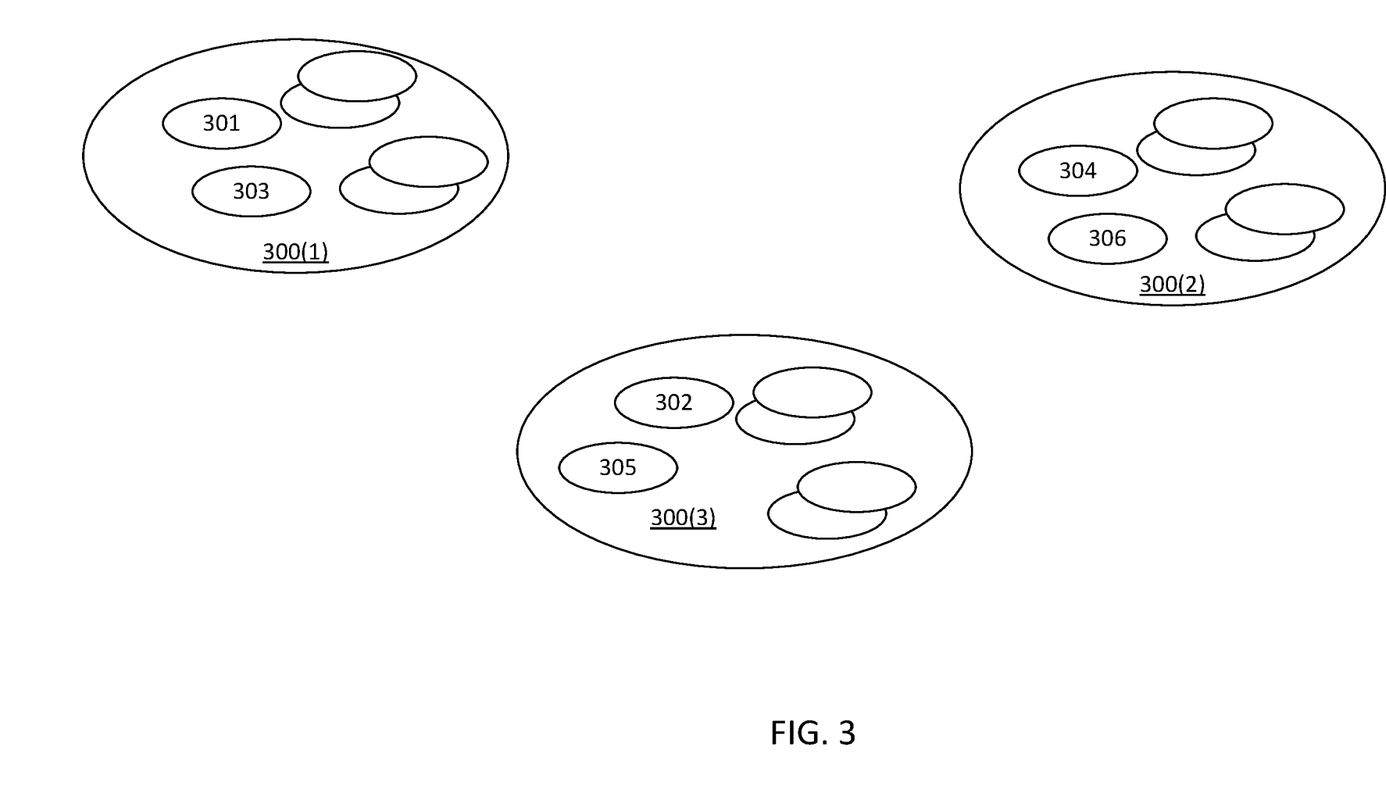
FIG. 3 illustrates an example of clusters.

FIG. 3 illustrates three clusters of data units. Cluster 300(1) includes data units 301 and 303 (among other data units) that are associated with matching activity signatures 101(1) and 101(3); Cluster 300(2) includes data units 304 and 306 (among other data units) that are associated with matching activity signatures 101(4) and 101(6); and Cluster 300(3) includes data units 302 and 305 (among other data units) that are associated with matching activity signatures 101(2) and 101(5).

When an access request for accessing (read or write) data unit 301 is received, other data units that belong to the same cluster 300(1) are prefetched to the cache, such as data unit 303, as it is expected that data unit 303 will be accessed soon, given the similarity in the activity signatures. The same applied to any data unit that belong to any cluster. When a data unit that belong to a certain cluster is requested to be read or written, and fetched to the cache memory, at least part or all of the data units that belong to the same certain cluster are prefetched to the cache memory.

Figure 4:
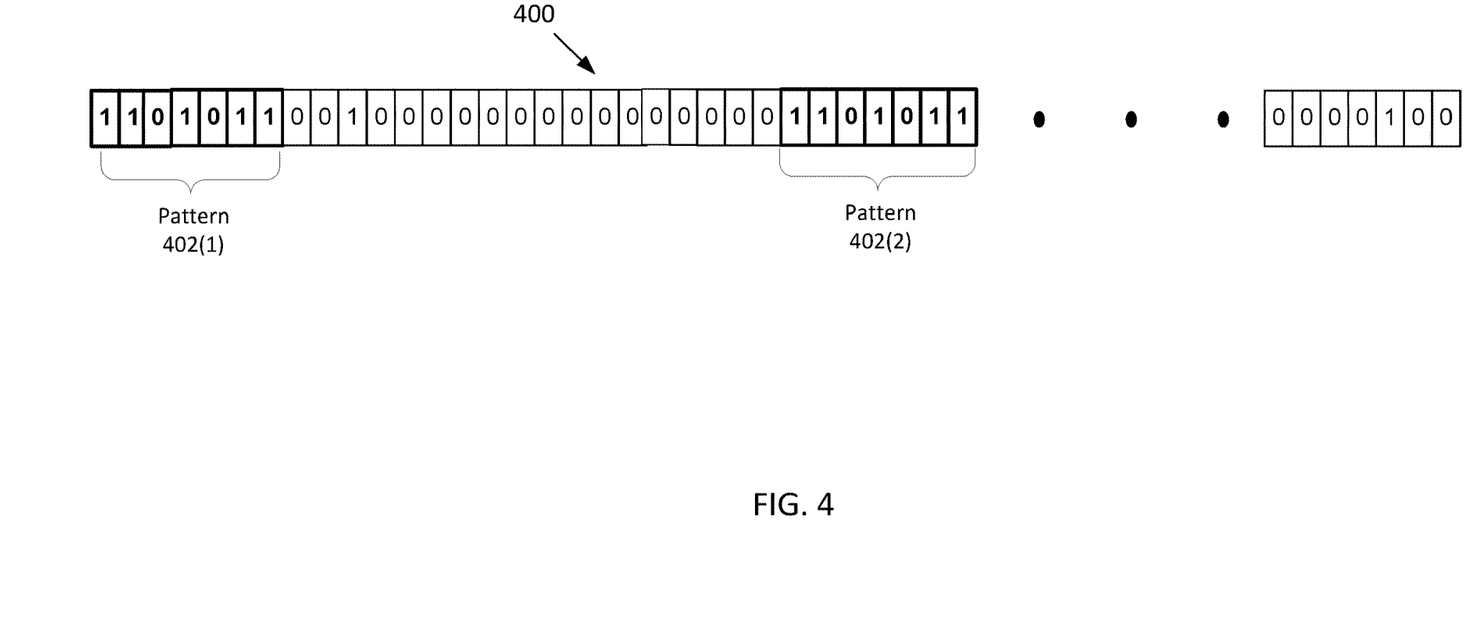
FIG. 4 illustrates an example of an activity signature.

The activity signatures can be further used for detecting repeating patterns, such as pattern 402(1) and pattern 402(2) detected in activity signature 400 of FIG. 4. The repeating patterns are indicative of periodic activity that can be observed for the data unit and for all other data units that belong to the same cluster. The time difference between the two periods of activity reflected by pattern 402(1) and pattern 402(2), can be easily calculated given the length of the time periods. Thus, once the data units of the cluster are fetched into the cache, the next prefetching can be scheduled according to the time difference. Alternatively, the absolute time of the repeating patterns can be obtained, based on the known time of day and dates during which the monitoring was performed for creating the activity signatures. The prefetch of the cluster can be scheduled according to the times of the repeating patterns.

Figure 5:
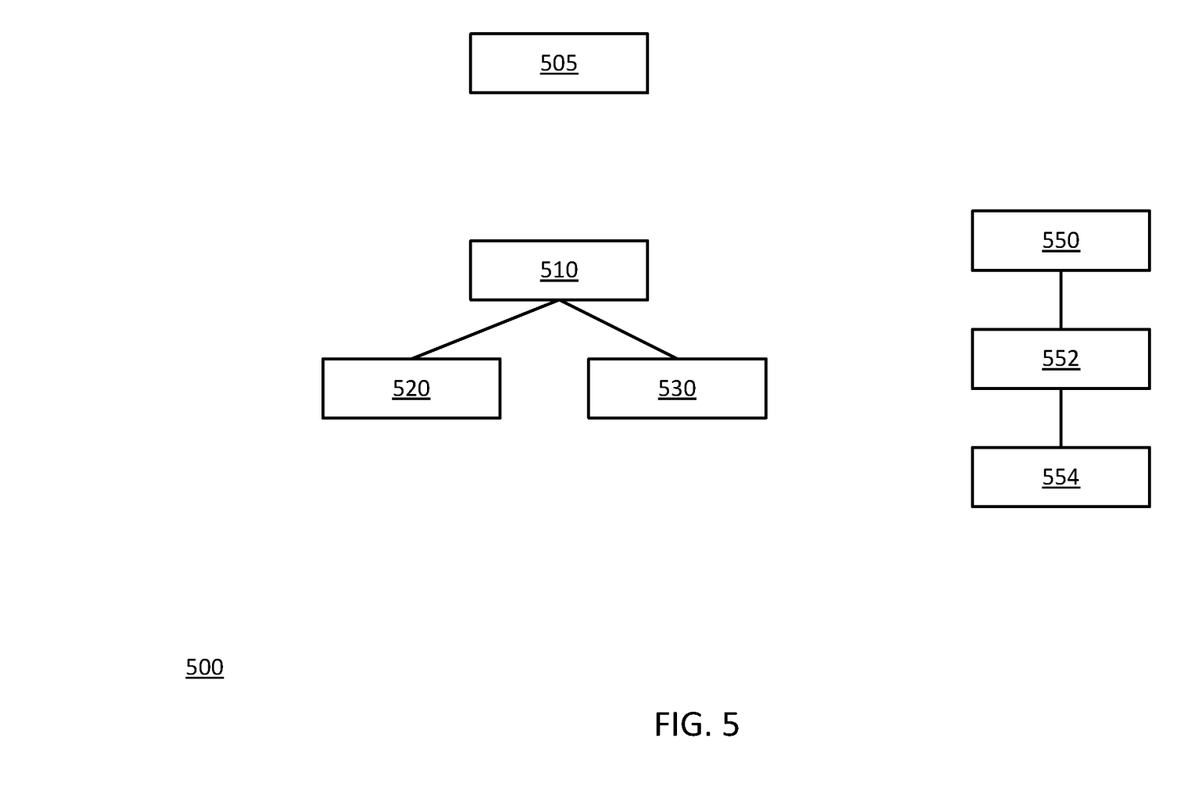
FIG. 5 illustrates an example of a method.

FIG. 1 illustrates method 500 for prefetching in a mass storage system.

Method 500 may start by step 510 of receiving or generating a request to fetch, to a cache memory of the mass storage system, a certain data unit that is currently not stored in the cache memory.

The certain data unit and additional data units form a certain cluster of data units.

The certain data unit and the additional data units have similar activity signatures. Similar activity signature may be activity signature that have up to a certain percent or number of elements that may differ from each other. For example—up to 1%, 5%, 10%, 15% deviations from each other. Yet for another example—the similar activity signatures may include the top X matching signatures –X being 5, 10, 150, 20, 25, 30 and the like. Yet for another example—the similar activity signatures may represent a clustering parameter that provides a desired tradeoff between clustering accuracy and resources allocated for performing the clustering process.

At least two data units of the certain cluster differ from each other by at least one of (a) a file system, (b) a logical volume, and (c) an accessing unit; wherein for each data unit of the certain cluster, an activity signature related to the data unit provides a coarse estimation of activity related to the data unit during multiple time periods.

Accordingly—method 500 may determine to perform pre-fetch of data units regardless of the storage location and/or logical volume and/or the accessing unit and/or the file system related to a fetched data unit. This enhances the effectiveness of the method over prefetch methods that are limited to locality, logical volume perspective, accessing unit perspective or file system perspective that consider prefetch based only on storage location (e.g., prefetching data units of close locations), data units that belong to the same logical volume of the fetched data unit, or the accessing unit of the fetched data unit, or the file system of the fetched data unit, respectively.

The estimation is coarse because it is related to time periods that are much longer (for example by 2, 3, 4 and more orders) than the duration of a fetching operation and/or because the estimate does not provide an exact number of accesses—rather may point to a range of access values out of a plurality of ranges. For example—assuming that the exact number of accesses per time period may be represented by a Y-bit value—then the coarse estimate may be represented by a much compact value (for example—less than 0.1Y, 0.2Y, 0.5Y bits, and the like).

In addition to the certain cluster, each cluster of at least some of the clusters or even all of the clusters (of the multiple clusters) may fulfill the following—at least two data units of the cluster may differ from each other by at least one of (a) a file system, (b) a logical volume, and (c) an accessing unit. Two or more other data units of the cluster may have the same a file system, and/or logical volume, and/or accessing unit.

Step 510 may be followed by steps 520 and 530.

Step 520 may include fetching the certain data unit stored in a mass storage system, into the cache memory.

Step 530 may include prefetching at least some of the additional data units that are not currently stored in the cache memory.

Each activity signature may be a bit map that allocates at least one bit per time period of the multiple time periods. See, for example, FIGS. 1 and 2.

Method 500 may also include step 505 of monitoring accesses related to multiple data units and generating multiple activity signatures for the multiple data units; and wherein the multiple data units comprise the certain data unit and the additional data units.

Step 505 may be executed in any timing relationship to steps 510, 520 and 530 —especially may start before the first execution of step 510 and may be executed, at least in part, in parallel to the execution of steps 510, 520 and 530. A first version of the multiple activity signatures may be generated before steps 510-530, while the monitoring of accesses and modifications or re-generations of the multiple activity signatures may be performed during steps 510-530.

The multiple data units may include a plurality of data units that do not belong to the certain cluster. Step 505 may include clustering the multiple data units to clusters, wherein the clusters include the certain cluster and at least one other cluster.

The activity signature may be indicative of whether there was any access to the data unit during each one of the multiple time periods.

The activity signature may be indicative of whether an amount of accesses to the data unit during each one of the multiple time periods exceeds an activity threshold.

A duration of each one of the multiple time periods may exceeds by a factor of at least one thousand a duration of the fetching of the certain data unit. The duration of each one of the multiple time periods may exceed a minute. The aggregate duration of the multiple time periods may exceed a day.

Method 500 may also include step 550 of searching within an activity signature of a data unit of the certain cluster of data units for a repetitive pattern having a repetition cycle; step 552 of determining, based on the repetitive pattern, a next repetition of the repetitive pattern; and step 554 of performing a prefetch operation based on the next repetition of the repetitive pattern. The next repetition may be associated with a timing (absolute or relative time) and the prefetch operation may be based on the timing of the next repetition.

Steps 550, 552, and 554 may be executed in any timing relationship to any other steps of method 500.

Figure 6:
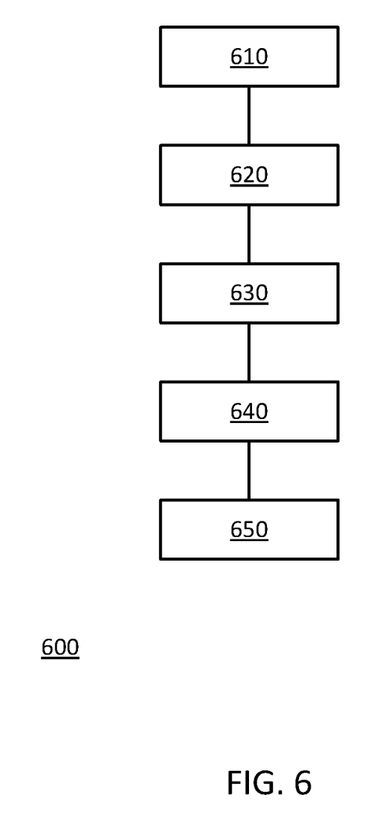
FIG. 6 illustrates an example of a method.

FIG. 6 illustrates method 600.

Method 600 may include step 610 of generating or receiving activity signatures of data units.

Step 610 may be followed by step 620 of clustering the data units to multiple clusters; wherein each cluster comprises data units having similar activity signatures; wherein at least two data units of a certain cluster of the multiple clusters differ from each other by at least one of (a) a file system, (b) a logical volume, and (c) an accessing unit; wherein for each data unit of the certain cluster, an activity signature related to the data unit provides a coarse estimation of activity related to the data unit during multiple time periods.

In addition to the certain cluster, each cluster of at least some of the clusters or even all of the clusters (of the multiple clusters) may fulfill the following—at least two data units of the may differ from each other by at least one of (a) a file system, (b) a logical volume, and (c) an accessing unit. Two or more other data units of the cluster may have the same a file system, and/or logical volume, and/or accessing unit.

Step 620 may be followed by step 630 of searching within an activity signature of a data unit of the certain cluster of data units for a repetitive pattern having a repetition cycle.

Step 630 may be followed by step 640 of determining, based on the repetitive pattern, a next repetition of the repetitive pattern.

Step 640 may be followed by step 650 of performing a prefetch operation based on the next repetition of the repetitive pattern. Thus a prefetching may be executed before the next repetition.

Figure 7:
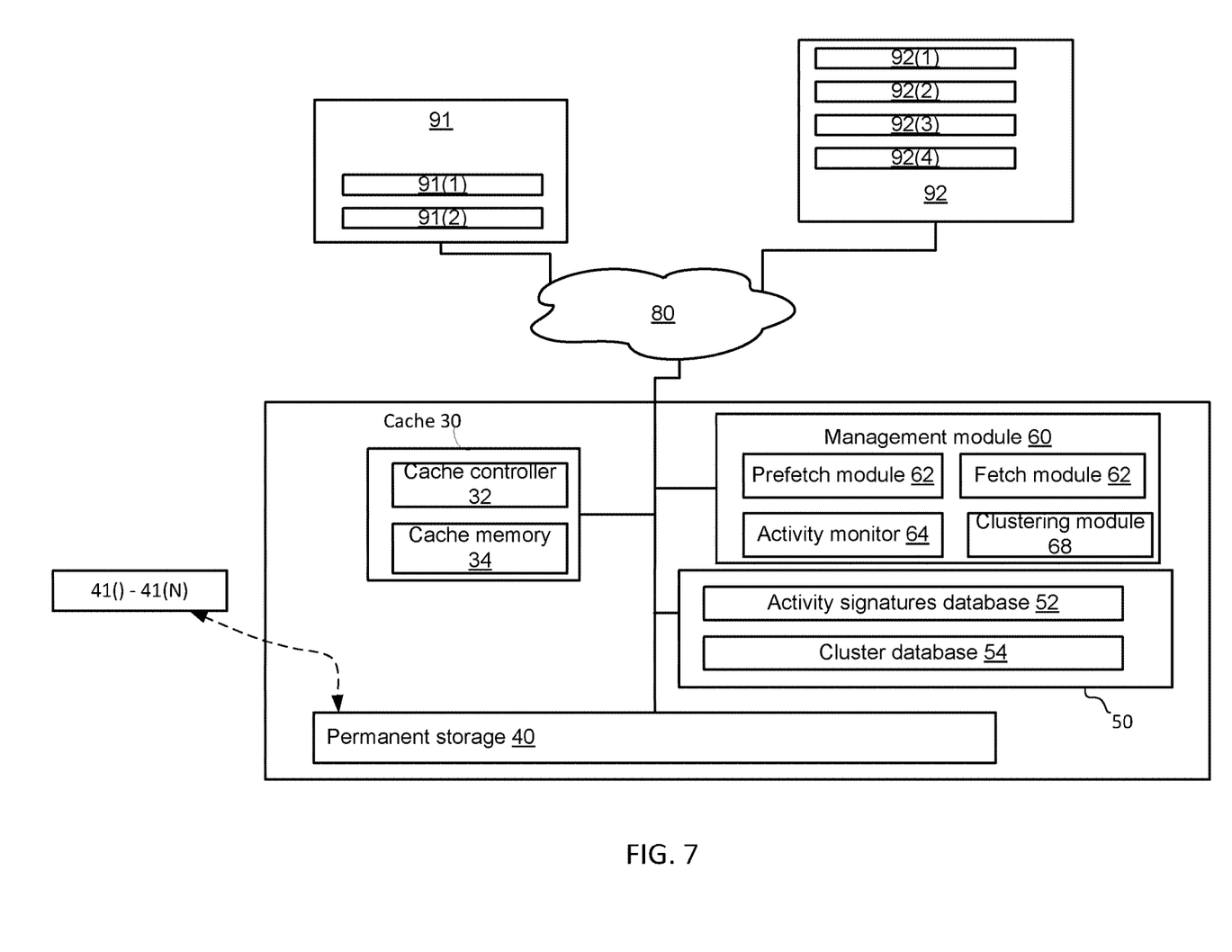
FIG. 7 illustrates an example of a mass storage system and its environment.

FIG. 7 illustrates a mass storage system 700 and two computerized systems 91 and 92.

The two computerized systems may be computers that may host multiple applications such as applications 91(1) and 91(1) hosted by computer 91 and applications 91(1), 92(2), 92(3) and 92(4) hosted by computer 92. Each one of the computerized systems and/or the applications may be regarded as an accessing unit.

The computers are coupled via network 80 to mass storage system 10 that includes permanent storage 40, cache 30, management module 60, memory 50, and permanent storage 40. Different logical volumes 41(N)-51(N) can be mapped to a plurality of physical storage devices of the permanent storage 40. The cache may include a cache controller 32 and a cache memory 34. The management module 60 may include a prefetch module 62 for managing prefetch operations, a fetch module 66 for managing fetch operations, clustering module 68 for clustering data units of similar activity signatures, and an activity monitor 64 for monitoring after accesses and generating the activity signatures.

The mass storage unit may execute any one of methods 600 and 500.

The terms "including", "comprising", "having", "consisting" and "consisting essentially of" are used in an interchangeable manner. For example—any method may include at least the steps included in the figures and/or in the specification, only the steps included in the figures and/or the specification.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for prefetching in a mass storage system, the method comprises:
receiving or generating a request to fetch, to a cache memory of the mass storage system, a certain data unit that is currently not stored in the cache memory; wherein the certain data unit and additional data units form a certain cluster of data units; wherein the certain data unit and the additional data units have similar activity signatures; wherein at least two data units of the certain cluster differ from each other by at least one of (a) a file system, (b) a logical volume, and (c) an accessing unit; wherein each data unit of the certain cluster is associated with an activity signature that provides estimation of activity related to the data unit during multiple time periods;
fetching the certain data unit stored in a mass storage unit; and
prefetching at least some of the additional data units that are not currently stared in the cache memory,
wherein the multiple data units comprise a plurality of data units that do not belong to the certain cluster; wherein the method comprises clustering the multiple data units to clusters, wherein the clusters comprise the certain cluster and at least one other cluster.

2. The method according to claim 1 wherein each activity signature is a bit map that allocates at least one bit per time period of the multiple time periods.

3. The method according to claim 1 comprising monitoring accesses related to multiple data units and generating multiple activity signatures for the multiple data units; and wherein the multiple data units comprise the certain data unit and the additional data units.

4. The method according to claim 1 wherein the activity signature is indicative of whether there was any access to the data unit during each one of the multiple time periods.

5. The method according to claim 1 wherein the activity signature is indicative of whether an amount of accesses to the data unit during each one of the multiple time periods exceeds an activity threshold.

6. The method according to claim 1 wherein a duration of each one of the multiple time periods exceeds by a factor of at least one thousand a duration of the fetching of the certain data unit.

7. The method according to claim 1 wherein a duration of each one of the multiple time periods exceeds a minute.

8. The method according to claim 1 wherein an aggregate duration of the multiple time periods exceeds a day.

9. The method according to claim 1 comprising searching within an activity signature of a data unit of the certain cluster of data units for a repetitive pattern having a repetition cycle; determining, based on the repetitive pattern, a next repetition of the repetitive pattern; and performing a prefetch operation based on the next repetition of the repetitive pattern.

10. A non-transitory computer readable medium that stores instructions that once executed by a mass storage system causes the mass storage system to execute the steps of: receiving or generating a request to fetch, to a cache memory of the mass storage system, a certain data unit that is currently not stored in the cache memory; wherein the certain data unit and additional data units form a certain cluster of data units; wherein the certain data unit and the additional data units have similar activity signatures; wherein at least two data units of the certain cluster differ from each other by at least one of (a) a file system, (b) a logical volume, and (c) an accessing unit; wherein each data unit of the certain cluster is associated with an activity signature that provides a coarse estimation of activity related to the data unit during multiple time periods; fetching the certain data unit stored in a mass storage unit; and prefetching at least some of the additional data units that are not currently stored in the cache memory,
wherein the multiple data units comprise a plurality of data units that do not belong to the certain cluster; wherein the method comprises clustering the multiple data units to clusters, wherein the clusters comprise the certain cluster and at least one other cluster.

11. The non-transitory computer readable medium according to claim 10 wherein each activity signature is a bit map that allocates at least one bit per time period of the multiple time periods.

12. The non-transitory computer readable medium according to claim 10 comprising monitoring accesses related to multiple data units and generating multiple activity signatures for the multiple data units; and wherein the multiple data units comprise the certain data unit and the additional data units.

13. The non-transitory computer readable medium according to claim 10 wherein the activity signature is indicative of whether there was any access to the data unit during each one of the multiple time periods.

14. The non-transitory computer readable medium according to claim 10 wherein the activity signature is indicative of whether an amount of accesses to the data unit during each one of the multiple time periods exceeds an activity threshold.

15. The non-transitory computer readable medium according to claim 10 wherein a duration of each one of the multiple time periods exceeds by a factor of at least one thousand a duration of the fetching of the certain data unit.

16. The non-transitory computer readable medium according to claim 10 wherein a duration of each one of the multiple time periods exceeds a minute.

17. The non-transitory computer readable medium according to claim 10 wherein an aggregate duration of the multiple time periods exceeds a day.

18. The non-transitory computer readable medium according to claim 10 that stores instructions for searching within an activity signature of a data unit of the certain cluster of data units for a repetitive pattern having a repetition cycle; determining, based on the repetitive pattern, a next repetition of the repetitive pattern; and performing a prefetch operation based on the next repetition of the repetitive pattern.

19. A method for prefetching in a mass storage system, the method comprises:
generating or receiving activity signatures of a data units;
clustering the data units to multiple clusters; wherein each cluster comprises data units having similar activity signatures; wherein at least two data units of a certain cluster of the multiple clusters differ from each other by at least one of (a) a file system, (b) a logical volume, and (c) an accessing unit; wherein each data unit of the certain cluster is associated with an activity signature related to the data unit provides a coarse estimation of activity related to the data unit during multiple time periods;

searching within an activity signature of a data unit of the certain cluster of data units for a repetitive pattern having a repetition cycle;

determining, based on the repetitive pattern, a next repetition of the repetitive pattern; and performing a prefetch operation based on the next repetition of the repetitive pattern.

* * * * *